(12) United States Patent
Huang

(10) Patent No.: US 12,010,747 B2
(45) Date of Patent: Jun. 11, 2024

(54) METHOD FOR LINK CONNECTION, ELECTRONIC DEVICE AND STORAGE MEDIUM

(71) Applicant: GUANGDONG OPPO MOBILE TELECOMMUNICATIONS CORP., LTD., Dongguan (CN)

(72) Inventor: Yuan Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 393 days.

(21) Appl. No.: 17/398,879

(22) Filed: Aug. 10, 2021

(65) Prior Publication Data

US 2021/0368571 A1 Nov. 25, 2021

Related U.S. Application Data

(63) Continuation of application No. PCT/CN2020/071850, filed on Jan. 13, 2020.

(30) Foreign Application Priority Data

Feb. 12, 2019 (CN) .......................... 201910111634.7

(51) Int. Cl.
 *H04W 76/15* (2018.01)
 *H04W 40/12* (2009.01)
 (Continued)

(52) U.S. Cl.
 CPC ........... *H04W 76/15* (2018.02); *H04W 40/12* (2013.01); *H04L 45/245* (2013.01); *H04L 65/40* (2013.01);
 (Continued)

(58) Field of Classification Search
 CPC ..... H04W 76/00; H04W 76/10; H04W 76/15; H04W 40/00; H04W 40/02; H04W 40/12;
 (Continued)

(56) References Cited

U.S. PATENT DOCUMENTS

2008/0056141 A1 3/2008 Sheinfeld et al.
2011/0261812 A1* 10/2011 Kini ........................ H04L 45/50
370/389

(Continued)

FOREIGN PATENT DOCUMENTS

CN 102014019 A 4/2011
CN 103716252 A 4/2014
(Continued)

OTHER PUBLICATIONS

Extended European Search Report dated May 24, 2022 received in European Patent Application No. EP 20756697.7.
(Continued)

*Primary Examiner* — Warner Wong
(74) *Attorney, Agent, or Firm* — Sheppard, Mullin, Richter, & Hampton, LLP

(57) ABSTRACT

Systems and methods for a link connection method for an electronic device are provided. An operating parameter of at least one application is acquired in response to detecting at least one application running in the foreground by the electronic device. A connection state of a communication link of the at least one application is detected, the communication link comprising at least a first communication link and a second communication link. A smart link aggregation is performed on the first communication link and the second communication link according to the operating parameter.

9 Claims, 6 Drawing Sheets

(51) Int. Cl.
*H04L 45/24* (2022.01)
*H04L 65/40* (2022.01)
*H04L 67/00* (2022.01)
*H04W 36/00* (2009.01)

(52) U.S. Cl.
CPC ......... *H04L 67/00* (2013.01); *H04W 36/0069* (2018.08)

(58) Field of Classification Search
CPC ....... H04W 36/0069; H04W 36/00692; H04W 36/28; H04L 45/245; H04L 65/40; H04L 67/00
See application file for complete search history.

(56) References Cited

U.S. PATENT DOCUMENTS

| | | | |
|---|---|---|---|
| 2013/0003559 A1* | 1/2013 | Matthews | H04L 43/0876 370/241 |
| 2014/0029527 A1 | 1/2014 | Okuda | |
| 2015/0263908 A1 | 9/2015 | Gordon et al. | |
| 2015/0382239 A1 | 12/2015 | Bott et al. | |
| 2016/0156752 A1* | 6/2016 | Li | H04L 69/324 370/474 |
| 2017/0288986 A1 | 10/2017 | Van Oost et al. | |
| 2018/0049046 A1 | 2/2018 | Lunttila et al. | |
| 2018/0109451 A1* | 4/2018 | Wei | H04L 69/166 |
| 2018/0184428 A1* | 6/2018 | Cariou | H04W 12/06 |
| 2020/0067825 A1 | 2/2020 | Huang | |
| 2020/0067826 A1* | 2/2020 | Lin | H04W 76/15 |
| 2021/0144028 A1* | 5/2021 | Yu | H04L 45/74 |

FOREIGN PATENT DOCUMENTS

| | | | | |
|---|---|---|---|---|
| CN | 103747471 A | | 4/2014 | |
| CN | 104956758 | * | 9/2015 | ............ H04W 72/12 |
| CN | 105308919 A | | 2/2016 | |
| CN | 106412091 A | | 2/2017 | |
| CN | 106850455 A | | 6/2017 | |
| CN | 107770814 A | | 3/2018 | |
| CN | 108881012 A | | 11/2018 | |
| CN | 109041262 A | | 12/2018 | |
| CN | 109067571 A | | 12/2018 | |
| CN | 109120524 A | | 1/2019 | |
| CN | 109274596 A | | 1/2019 | |
| CN | 109287001 A | | 1/2019 | |
| CN | 109729556 A | | 5/2019 | |

OTHER PUBLICATIONS

Grant Notice & Supplementary Search from corresponding Chinese Application No. 202010998231.1, dated Jun. 8, 2023 . English translation attached.
Sen et al., "Evaluation System of Mobile Internet User Experience Based on Big Data Analysis", Telecommunications Science, 04, Apr. 20, 2015, full text. English translation of Abstract only.
Liang et al., "Load Balance Algorithm of Multiple Links Based on Traffic Schedule", Computer Engineering, 09, May 5, 2011, full text. English translation of Abstract only.
International Search Report and Written Opinion date Apr. 1, 2020 in International Application No. PCT/CN2020/071850. English translation attached.
First Office Action from corresponding Chinese Application No. 201910111634.7, dated Feb. 3, 2020. English translation attached.
The Grant Notice from corresponding Chinese Application No. 201910111634.7, dated Jul. 6, 2020. English translation attached.
First Office Action from corresponding Chinese Application No. 202010998231.1, dated Nov. 28, 2022 . English translation attached.

* cited by examiner

METHOD FOR LINK CONNECTION, ELECTRONIC DEVICE AND STORAGE MEDIUM

CROSS-REFERENCE TO RELATED APPLICATION(S)

This application is a continuation of International Application No. PCT/CN2020/071850, filed on Jan. 13, 2020, which claims priority to Chinese Patent Application No. 201910111634.7, filed on Feb. 12, 2019, the entire disclosures of which are hereby incorporated by reference.

TECHNICAL FIELD

This disclosure relates to electronic devices, and particularly to a method for link connection and related device.

BACKGROUND

With the development of mobile communication technology, users have shown an increasing demand for data communication capabilities. Currently, smart terminals on the market generally send data through cellular mobile network communication or Wi-Fi communication mechanisms during data transmission. Some Wi-Fi signals are very weak in some mobile environments. In such mobile environments, a user's mobile phone cannot access the Internet, which seriously affects the normal use of the smart terminal by the user. When changing mobile environments, the network supporting such smart terminals, e.g., mobile phones also changes continuously. Freezing and operational delays will occur at the smart terminals, which seriously affects a user's experience.

SUMMARY

According to a first aspect, embodiments provide a method for link connection. The method is for an electronic device. The method includes the following.

An operating parameter of at least one application is acquired in response to detecting at least one application running in the foreground.

A connection state of a communication link of the at least one application is detected, the communication link comprising at least a first communication link and a second communication link.

A smart link aggregation is performed on the first communication link and the second communication link according to the operating parameter.

According to a second aspect, embodiments provide an electronic device. An electronic device comprising a communication interface, one or more processors, a memory and one or more programs, wherein the one or more programs including instructions are stored in the memory and configured to be executed by the one or more processors to perform the method of the first aspect.

According to a third aspect, embodiments provide a non-transitory computer-readable storage medium. The non-transitory computer-readable storage comprising: one or more processors, a memory, and one or more programs, wherein the one or more programs including instructions are stored in the memory and configured to be executed by the one or more processors to perform the method of the first aspect.

DRAWINGS

The present disclosure, in accordance with one or more various embodiments, is described in detail with reference to the following figures. The figures are provided for purposes of illustration only and merely depict typical or example embodiments.

DETAILED DESCRIPTION

Technical solutions in embodiments of the present disclosure will be described clearly and completely hereinafter with reference to the accompanying drawings. The described embodiments are merely examples and other embodiments are contemplated by the present disclosure. All other embodiments obtained by those of ordinary skill in the art based on the embodiments of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" referred to herein means that a particular feature, structure, or feature described in conjunction with the embodiment may be contained in at least one embodiment of the present disclosure. The term embodiment as used herein does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

The electronic device involved in the embodiments of the present disclosure may transmit data wirelessly. The electronic device may include various handheld devices, in-vehicle devices, wearable devices, computing devices that have wireless communication functions or other processing devices connected to the wireless modem, as well as various forms of user equipment (UE), mobile stations (MS), terminal devices, and the like.

The following elaborates on some embodiments of the disclosure.

Figure 1:
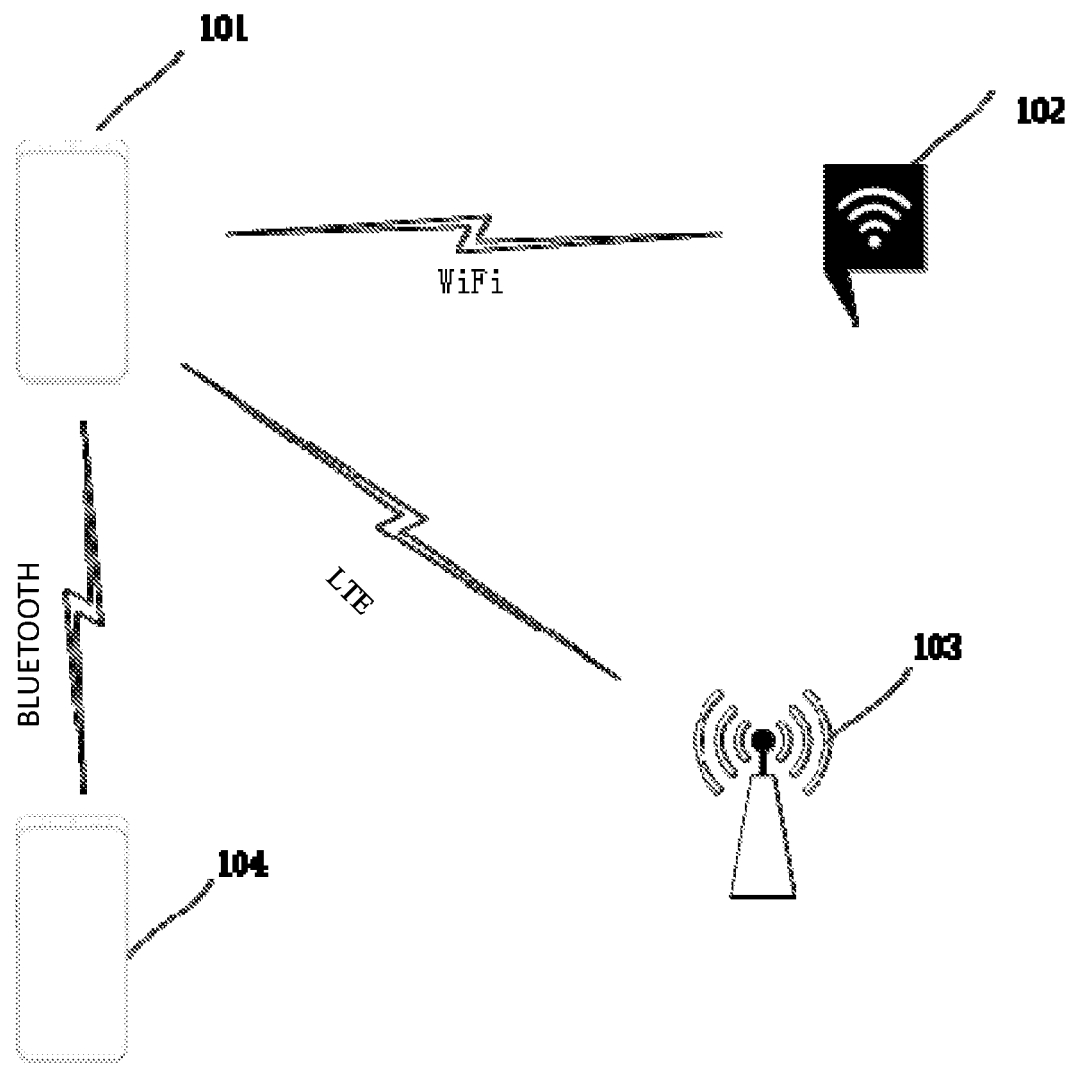
FIG. 1 is a schematic architecture diagram of a wireless communication system where an electronic device is located according to embodiments.

Link aggregation means that the device can use two or more network ports to access the Internet at the same time. For example, Wi-Fi and data networks are used for network access at the same time through link aggregation on a mobile phone. In an Android network system, when Wi-Fi is enabled, the data network will be unavailable (the connectivity Service network scoring mechanism causes the disconnection of the data network), and link aggregation requires at least two or more available networks, so the prerequisite of the Service-Level Agreement (SLA) is to enable the coexistence of Wi-Fi and data networks. As illustrated in FIG. 1, at present, the first terminal 101 can be connected to the data network 103, and the data network is a communication network used to transmit data services. The first terminal device can connect to access point 102 through Wi-Fi. Wi-Fi enables electronic devices to connect to a wireless local area network, and 2.4 GUHF or 5G SHF ISM are typically-used radio frequency bands. The first terminal device 101 can connect to a second terminal device 104 through Bluetooth. Bluetooth refers to a wireless technology standard that can realize short-distance data exchange between fixed devices, mobile devices and building personal area networks (using UHF radio waves in the 2.4-2.485 GHz ISM band), etc.

Figure 2:
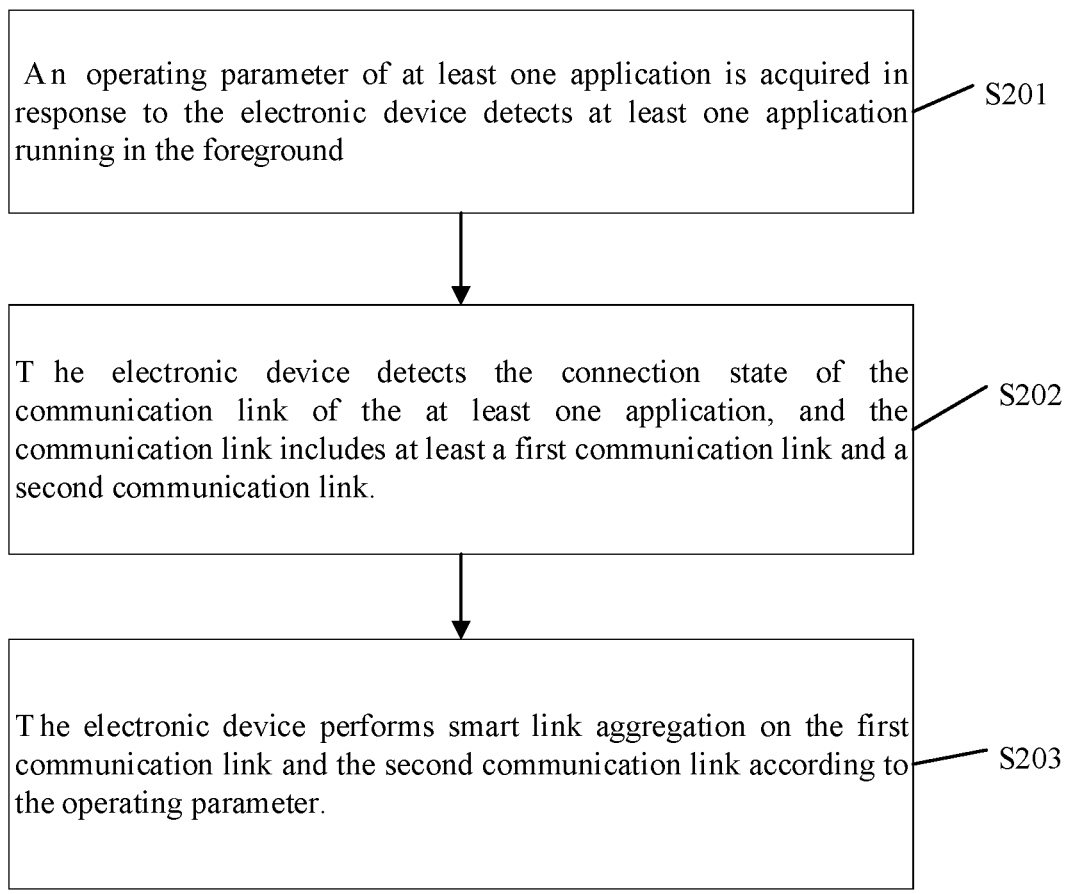
FIG. 2 is a schematic flow chart illustrating a method for link connection according to embodiments.

FIG. 2 is a schematic flow chart illustrating a method for link connection according to embodiments, performed by an electronic device. As shown in the figure, the link connection method comprises the following At block S201, an operating parameter of at least one application is acquired in response to the electronic device detects the at least one application running in the foreground.

Alternatively, the application (embodiments of which are not limited) may be a game application, a video application, etc.

Alternatively, the operating parameter may include (embodiments of which are not limited) time delay, historical operating time, and interactive state parameter.

At block S202, the electronic device detects the connection state of the communication link of the at least one application, and the communication link includes at least a first communication link and a second communication link.

At block S203, the electronic device performs smart link aggregation on the first communication link and the second communication link according to the operating parameter.

Optionally, the smart link aggregation includes transmitting data through a cellular communication link, a Wi-Fi communication link, or a dual Wi-Fi communication link.

In an embodiment, the electronic device splits the data stream scheduled for processing, and then splits and transmits the link connection task scheduled for processing by activating the cellular mobile network module and the wireless local area network communication module. For example, the data packets are marked with different mark values, and then querying different routing tables by matching different mark values, so that the data packets can access the network from different interfaces.

According to the embodiment, the electronic device acquires an operating parameter of at least one application in response to detecting the at least one application running in the foreground. Then, a connection state of a communication link of the at least one application is detected, the communication link comprising at least a first communication link and a second communication link Finally, a smart link aggregation is performed on the first communication link and the second communication link according to the operating parameter. Therefore, the electronic device can allocate different communication links to the application currently running in the foreground according to different operating parameter, so as to allocate the application resources are in each link. It can improve the stability of the link connection, reduce the network delay, and improve the link connection quality of the electronic devices. It can avoid the network disconnection and reconnection caused by the network delay, and enhance the application experience.

In another embodiment, the operating parameter comprises time delay. Performing the smart link aggregation on the first communication link and the second communication link according to the operating parameter comprises: acquiring the time delay of the application; acquiring a link quality parameter of the first communication link and a link quality parameter of the second communication link in response to the time delay being shorter than a preset time delay; determining a target communication link, wherein the link quality parameter of the target communication link is less than a preset ink quality parameter; and performing a smart link aggregation on the communication link other than the target communication link Optionally, the historical running time is the cumulative use time of the application (embodiments of which are not limited) in one month, three months, or half a year, and the specific time period is not uniquely limited.

Optionally, the preset time delay can be set by the manufacturer at the factory or obtained according to the historical network rate (embodiments of which are not limited).

According to this embodiment, the electronic device can flexibly adjust the link according to the operating parameter, and determine the link with time delay, and then perform smart link aggregation on the link with no delay or low delay. It ensures the stability and fluency of the link when the application is running. It is conducive to improve the intelligence and stability of the link connection.

In an optional embodiment, the operating parameter comprises time delay and historical operating time. Performing the smart link aggregation on the first communication link and the second communication link according to the operating parameter comprises: acquiring the time delay of the at least one application; selecting an application with the time delay longer than a preset time delay; acquiring the historical operating time of each application of the application with the time delay longer than a preset time delay; determining a first target application wherein the historical operating time of the first target application is longer than a preset operating time; detecting a touch operation on the first target application; and closing the communication link corresponding to the first target application in response to the touch operation is not detected, the communication link comprising at least one of the first communication link and the second communication link.

Optionally, the preset time delay can be set by the manufacturer at the factory or obtained according to the historical network rate (embodiments of which are not limited).

Optionally, the preset running time (embodiments of which are not limited) can be three days, five days, half a month.

Optionally, the closing the communication link corresponding to the first target application may be that the communication link of the first target application is only closed when it is associated with the first target application.

For example, there are A application, B application and C application running in the foreground, and the obtained time delay of A application, B application and C application respectively are 20 ms, 60 ms, 61 ms. The B application and C application are selected due to the time delay of B application and C application exceeding the preset delay of 50 ms. It is understood that the historical running time of B application is 100 minutes and the historical running time of C application is 300 minutes, and then check is performed to determine whether the user has touch operation on the C application. If not, the first link corresponding to the C application is closed, wherein the first link is only associated with the C application.

According to this embodiment, the electronic device adjusts the communication link according to multiple operating parameter of at least one application running in the foreground, and screens out applications with poor network speed, and further improves the current network instability by closing the channel. It is conducive to maintain link connection stability, reduce network delay, and improve the link connection quality of electronic devices.

In an optional embodiment, the operating parameter comprises interactive state parameter and time delay, and the interactive state parameter comprises continuous touch duration. Performing the smart link aggregation on the first communication link and the second communication link according to the operating parameter comprises: acquiring the continuous touch duration of each application of at least one application in a preset duration; selecting at least one target application, wherein the continuous touch duration of the at least one target application is longer than the preset duration; acquiring the time delay of at least one target application; determining a second target application, wherein the time delay of the second target application is longer than a preset time delay; and adjusting a link connection of the second target application.

Optionally, the interaction state parameter includes at least one of continuous touch time duration and single touch frequency.

Optionally, the application data of the second application is split into two parts of data, which are respectively transmitted from the first communication link and the second communication link.

Optionally, the interactive state parameter comprises single touch frequency, the adjusting of a connection state of the communication link of each application of the at least one application according to the operating parameter comprising: acquiring the single touch frequency of each application of the at least one application; selecting at least one target application, wherein the single touch frequency of the at least one target application is greater than a preset touch frequency; acquiring the time delay of the at least one target application; determining a second target application, wherein the time delay of the second target application is longer than a preset time delay; and adjusting the connection state of the communication link of the second target application.

According to this embodiment, the electronic device adjusts the link connection state in a timely manner according to the acquired interactive state parameters. It avoids the situation of wrongly closing or wrongly connecting the application in use, and is beneficial to improve the intelligence and stability of the link connection.

In an optional embodiment, the adjusting of the communication link of the second target application comprises: acquiring a link quality parameter of each communication link in the communication link connection; determining a target communication link, wherein with the link quality parameter of the target communication link is greater than a preset link quality parameter; and transmitting data of the second target application through the target communication link.

Alternatively, the link quality parameter may include (embodiments of which are not limited) the packet acceptance rate, the successful packet acceptance rate, the number of successful packet reception transmissions, the received signal strength indicator, the signal-to-noise ratio, the link quality indicator.

According to this embodiment, the electronic device can obtain the data volume of the data packet split by the link connection task according to the number of channel and link quality parameter, and screen out the target communication link with the best link quality for connection. It ensures that big data matches the high-quality link and is transmitted without delay. It helps to improve the intelligence and stability of the link connection.

In an optional embodiment, after determining a target communication link, wherein the link quality parameter of the target communication link is greater than a preset link quality parameter, the method further comprises: performing a shunt transmission on the data of the second target application, wherein the shunt transmission is configured to transmit data of the application through the target communication link and the communication link other than the target communication link simultaneously.

According to this embodiment, the electronic device can split the data of application with long time delay and transmit the data through the link. It reduces the network delay and increases the transmission rate. It guarantees the link connection quality, improves the link connection speed, and avoids delay.

In an optional embodiment, after transmitting data of the second target application through the target communication link, the method further comprises: determining a third target application, the third target application being a multi-user application, and being other than the second target application among the plurality of applications; maintaining the link connection between the third target application and the target communication link.

In some embodiments, the third target application may include (embodiments of which are not limited) a game application with multiple users playing a game(s), an online meeting application with multiple users accessing a meeting at the same time. In embodiments, the third target application may contain a big data packet.

According to this embodiment, the electronic device can adjust the connection link in time according to the third target application. It avoids the freezing situation when the mobile network is delayed, and ensures that the third target application runs on the communication link with good link quality. It is conducive to the maintain stability of the link connection, reduce network delay, and improve the link connection quality of electronic devices.

Figure 3:
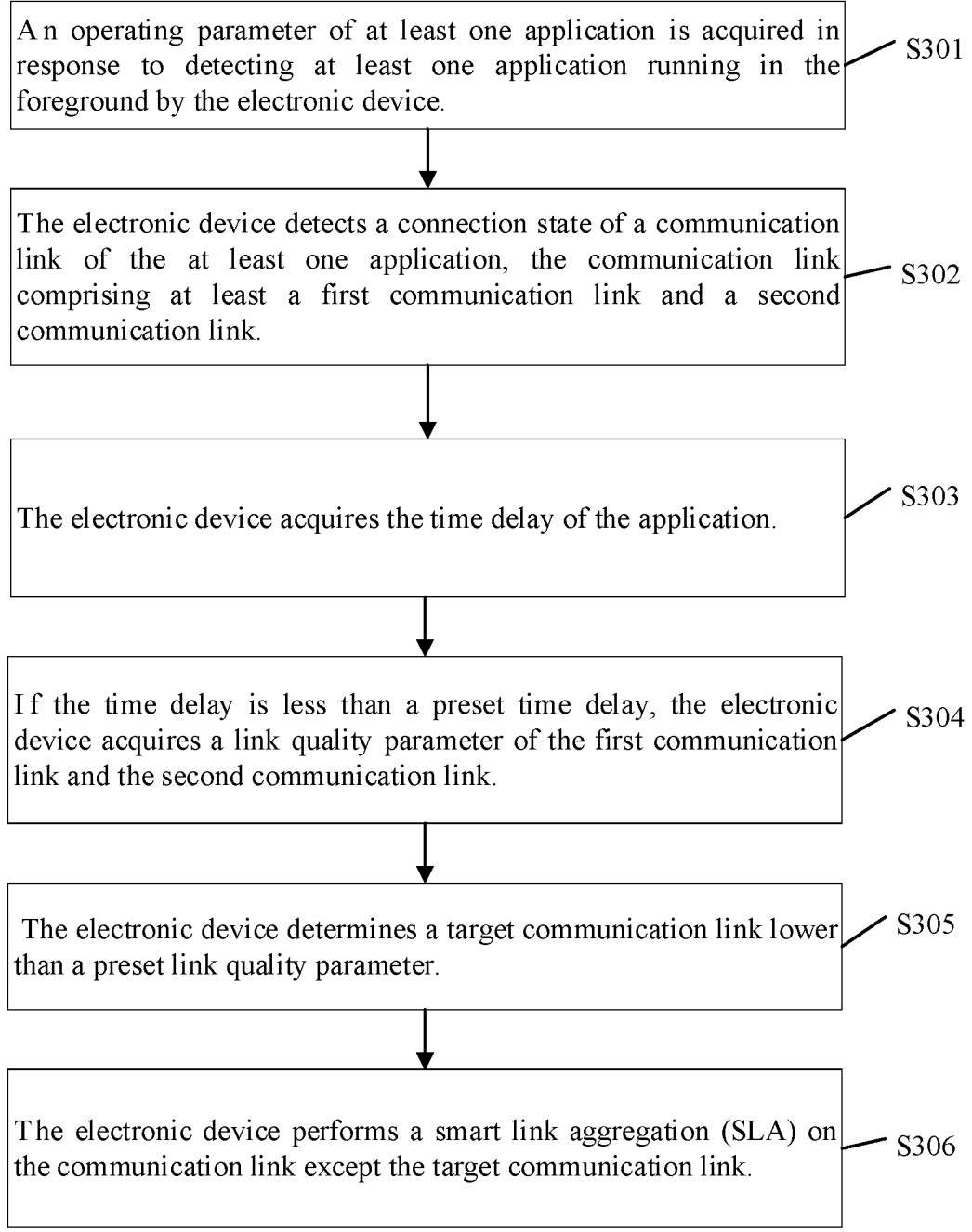
FIG. 3 is a schematic flow chart illustrating a method for link connection according to other embodiments.

Consistent with the embodiment shown in FIG. 2, FIG. 3 is a schematic flow chart illustrating a method for link connection according to other embodiments, performed by the electronic device illustrated in FIG. 1. As illustrated in the figure, the method for link connection comprises:

At block S301, an operating parameter of at least one application is acquired in response to detecting at least one application running in the foreground by the electronic device.

At block S302, the electronic device detects a connection state of a communication link of the at least one application, the communication link comprising at least a first communication link and a second communication link.

At block S303, the electronic device acquires the time delay of the application.

At block S304, if the time delay is shorter than a preset time delay, the electronic device acquires a link quality parameter of the first communication link and the second communication link.

At block S305, the electronic device determines a target communication link, wherein the link quality parameter of the target communication link is less than a preset link quality parameter.

At block S306, the electronic device performs a smart link aggregation on the communication link other than the target communication link.

According to this embodiment, an operating parameter of at least one application is acquired in response to detecting at least one application running in the foreground by the electronic device. Then, a connection state of a communication link of the at least one application is detected, the communication link comprising at least a first communication link and a second communication link. Finally, a smart link aggregation is performed on the first communication link and the second communication link according to the operating parameter. It can be seen that the electronic device can allocate different communication links to the application currently running in the foreground according to different operating parameter, so as to allocate the application resources are in each link. It can improve the stability of the link connection, reduce the network delay, and improve the link connection quality of the electronic devices. It can avoid the network disconnection and reconnection caused by the network delay, and enhance the application experience.

In addition, the electronic device can flexibly adjust the link according to the operating parameter, and determine the link with time delay, and then perform smart link aggregation on the link with no delay or low delay. It ensures the stability and fluency of the link when the application is running. It is conducive to improve the intelligence and stability of the link connection.

Figure 4:
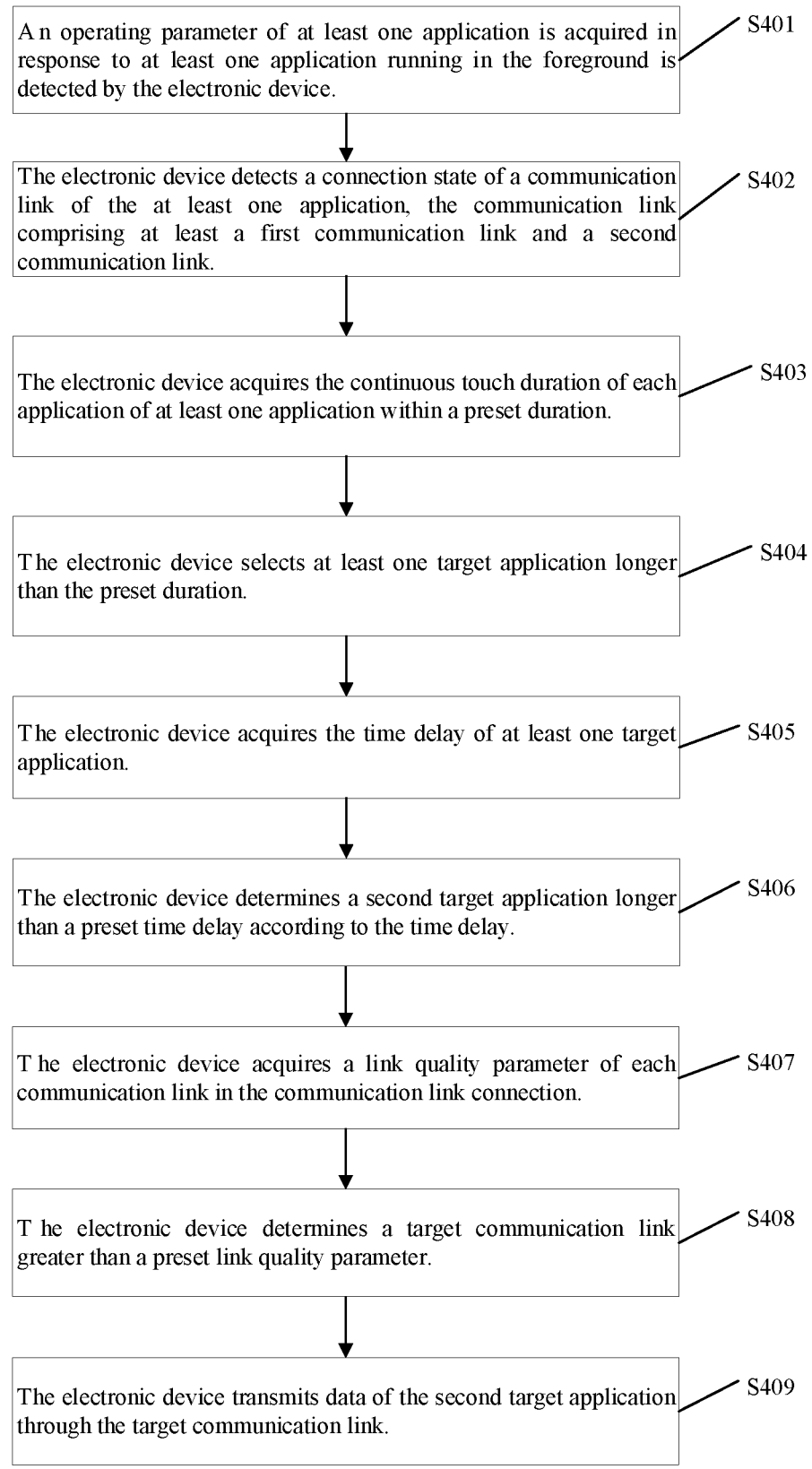
FIG. 4 is a schematic flow chart illustrating a method for link connection according to other embodiments.
Figure 5:
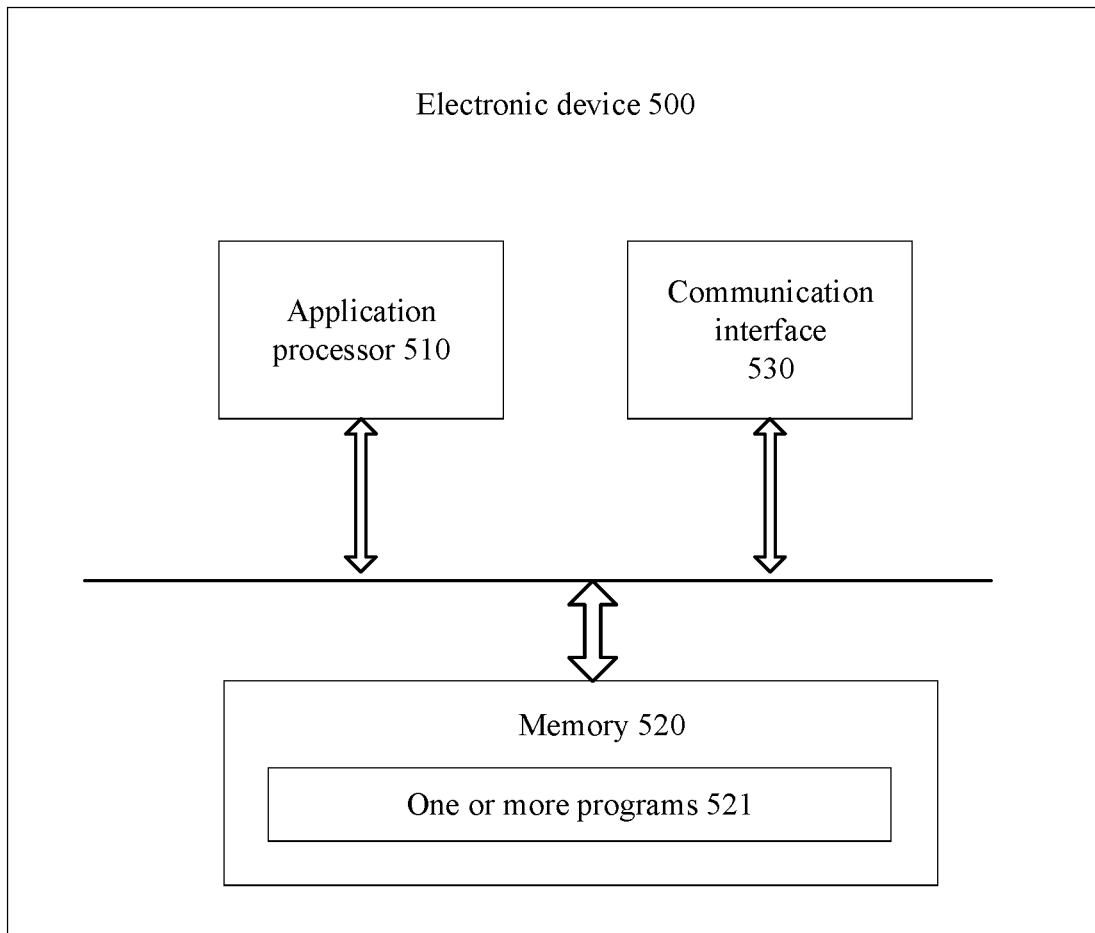
FIG. 5 is a schematic structural diagram illustrating an electronic device according to embodiments.

Consistent with the embodiment shown in FIG. 2, FIG. 4 is a schematic flow chart illustrating a method for link connection according to other embodiments, performed by an electronic device. As illustrated in the figure, the method for link connection comprises:

At block S401, an operating parameter of at least one application is acquired in response to the at least one application running in the foreground is detected by the electronic device.

At block S402, the electronic device detects a connection state of a communication link of the at least one application, the communication link comprising at least a first communication link and a second communication link.

At block S403, the electronic device acquires the continuous touch duration of each application of at least one application in a preset duration.

At block S404, the electronic device selects at least one target application, wherein the continuous touch duration of the at least one target application is longer than the preset duration.

At block S405, the electronic device acquires the time delay of at least one target application.

At block S406, the electronic device determines a second target application, wherein the time delay of the second target application is longer than a preset time delay.

At block S407, the electronic device acquires a link quality parameter of each communication link in the communication link connection.

At block S408, the electronic device determines a target communication link, wherein the link quality parameter of the target communication link is greater than a preset link quality parameter.

At block S409, the electronic device transmits data of the second target application through the target communication link.

According to this embodiment, an operating parameter of at least one application is acquired in response to detecting at least one application running in the foreground by the electronic device. Then, a connection state of a communication link of the at least one application is detected, the communication link comprising at least a first communication link and a second communication link. Finally, a smart link aggregation is performed on the first communication link and the second communication link according to the operating parameter. It can be seen that the electronic device can allocate different communication links to the application currently running in the foreground according to different operating parameter, so as to allocate the application resources are in each link. It can improve the stability of the link connection, reduce the network delay, and improve the link connection quality of the electronic devices. It can avoid the network disconnection and reconnection caused by the network delay, and enhance the application experience.

In addition, the electronic device adjusts the link connection state in a timely manner according to the acquired interaction state parameter. It avoids the situation of wrongly closing or wrongly connecting the application in use, which is beneficial to improve the intelligence and stability of the link connection.

Consistent with the embodiment shown in FIG. 2, FIG. 3, and FIG. 4, FIG. 5 is a schematic structural diagram illustrating an electronic device 500 according to embodiments. As illustrated in the figure, the electronic device 500 includes an application processor 510, a memory 520, a communication interface 530, and one or more programs 521, where the one or more programs 521 are stored in the memory 520 and are configured to be executed by the processor 510, the one or more programs 521 include instructions for: acquiring an operating parameter of at least one application in response to detecting at least one application running in the foreground by the electronic device; detecting a connection state of a communication link of the at least one application, the communication link comprising at least a first communication link and a second communication link; performing a smart link aggregation on the first communication link and the second communication link according to the operating parameter.

According to this embodiment, an operating parameter of at least one application is acquired in response to detecting at least one application running in the foreground by the electronic device. Then, a connection state of a communication link of the at least one application is detected, the communication link comprising at least a first communication link and a second communication link. Finally, a smart link aggregation is performed on the first communication link and the second communication link according to the operating parameter. It can be seen that the electronic device can allocate different communication links to the application currently running in the foreground according to different operating parameter, so as to allocate the application resources are in each link. It can improve the stability of the link connection, reduce the network delay, and improve the link connection quality of the electronic devices. It can avoid the network disconnection and reconnection caused by the network delay, and enhance the application experience.

In another embodiment, the operating parameter comprises time delay. Performing the smart link aggregation on the first communication link and the second communication link according to the operating parameter, one or more programs include instructions for: acquiring the time delay of the application; acquiring a link quality parameter of the first communication link and a link quality parameter of the second communication link in response to the time delay shorter than a preset time delay; determining a target communication link, wherein the link quality parameter of the target communication link is less than a preset link quality parameter; and performing a smart link aggregation on the communication link other than the target communication link.

In an optional embodiment, wherein the operating parameter comprises time delay and historical operating time, to perform the smart link aggregation on the first communication link and the second communication link according to the operating parameter, one or more programs include instructions for: acquiring the time delay of the at least one application; selecting an application with the time delay longer than a preset time delay; acquiring the historical operating time of each application of the application with the time delay longer than a preset time delay; determining a first target application, wherein the historical operating time of the first target application is longer than a preset operating time; detecting a touch operation on the first target application; closing the communication link corresponding to the first target application in response to the touch operation is not detected, the communication link comprising at least one of the first communication link and the second communication link.

In an optional embodiment, the operating parameter comprises interactive state parameter and time delay, the interactive state parameter comprises continuous touch duration, wherein to perform the smart link aggregation on the first communication link and the second communication link according to the operating parameter, one or more programs include instructions for: acquiring the continuous touch duration of each application of at least one application in a preset duration; selecting at least one target application, wherein the continuous touch duration of the at least one target application is longer than the preset duration; acquiring the time delay of at least one target application; determining a second target application, wherein the time delay of the second target application is longer than a preset time delay; and adjusting a link connection of the second target application.

In an optional embodiment, wherein the adjusting the communication link of the second target application, one or programs include instructions for: acquiring a link quality parameter of each communication link in the communication link connection i; determining a target communication link, wherein the link quality parameter of the target communication link is greater than a preset link quality parameter; transmitting data of the second target application through the target communication link.

In an optional embodiment, after determining a target communication link, wherein the link quality parameter of the target communication link is greater than a preset link quality parameter, one or more programs further comprises instructions for: performing a shunt transmission on the data of the second target application, wherein the shunt transmission is configured to transmit data of the application through the target communication link and the communication link other than the target communication link simultaneously.

In an optional embodiment, after transmitting data of the second target application through the target communication link, one or more programs further comprises instructions for: determining a third target application, the third target application being a multi-user application, and being other than the second target application among the plurality of applications; maintaining the link connection between the third target application and the target communication link.

In an optional embodiment, wherein the operating parameter comprises interactive state parameter and time delay, the interactive state parameter comprises single touch frequency, to perform the smart link aggregation on the first communication link and the second communication link according to the operating parameter, one or more programs further comprises instructions for: acquiring the single touch frequency of each application of the at least application; selecting at least one target application, wherein the single touch frequency of the at least one target application is greater than a preset touch frequency; acquiring the time delay of the at least one target application, and determining a second target application, wherein the time delay of the second target application is longer than a preset time delay; adjusting a connection state of the communication link of the second target application.

In an optional embodiment, the smart link aggregation comprises transmitting data through a cellular communication link, a Wi-Fi communication link, or a dual Wi-Fi communication link.

The foregoing solution of the embodiments of the disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the embodiments disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such embodiments should not be considered as beyond the scope of the present disclosure.

According to the embodiments of the disclosure, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the embodiments of the present disclosure is schematic, and is merely a logical function division, and there may be other division manners in actual embodiment.

Figure 6:
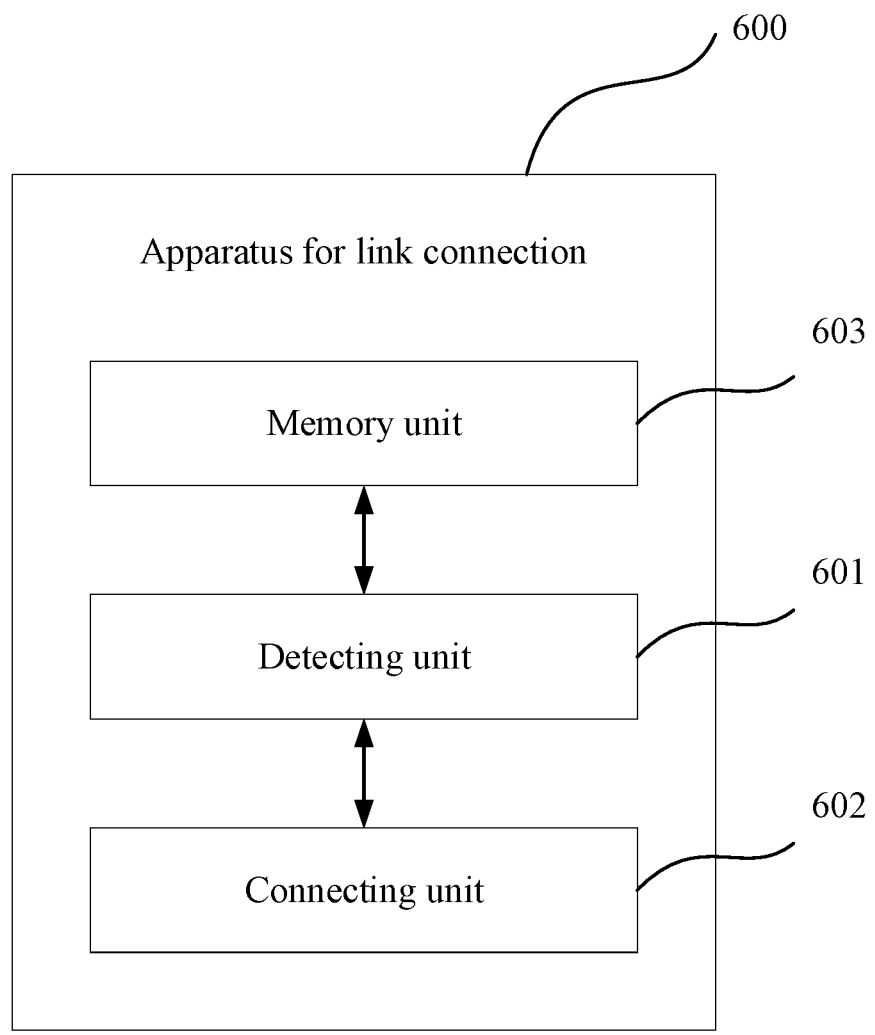
FIG. 6 is a block diagram illustrating functional units of an apparatus for link connection according to embodiments.

FIG. 6 is a block diagram illustrating functional units of an apparatus 600 for link connection according to embodiments. The apparatus 600 for link connection for an electronic device, comprises a detecting unit 601 and a connecting unit 602. The detecting unit 601 is configured to acquire an operating parameter of at least one application in response to detecting at least one application running in the foreground. The detecting unit 601 is further configured to detect a connection state of a communication link of the at least one application, the communication link comprising at least a first communication link and a second communication link; and The connecting unit 602 is configured to perform a smart link aggregation on the first communication link and the second communication link according to the operating parameter.

Optionally, the apparatus 600 for link connection further includes a memory unit 603 for storing program codes and data of the electronic device.

According to this embodiment, an operating parameter of at least one application is acquired in response to detecting at least one application running in the foreground by the electronic device. Then, a connection state of a communication link of the at least one application is detected, the communication link comprising at least a first communication link and a second communication link Finally, a smart link aggregation is performed on the first communication link and the second communication link according to the operating parameter. It can be seen that the electronic device can allocate different communication links to the application currently running in the foreground according to different operating parameter, so as to allocate the application resources are in each link. It can improve the stability of the link connection, reduce the network delay, and improve the link connection quality of the electronic devices. It can avoid the network disconnection and reconnection caused by the network delay, and enhance the application experience.

In an optional embodiment, the operating parameter comprises time delay. When performing of the smart link aggregation on the first communication link and the second communication link according to the operating parameter, the connecting unit 602 is configured to acquire the time delay of the application. A link quality parameter of the first communication link and the second communication link is acquired in response to the time delay shorter than a preset time delay. A target communication link is determined, wherein the link quality parameter of the target communication link is less than a preset link quality parameter. A smart link aggregation is performed on the communication link other than the target communication link.

In an optional embodiment, the operating parameter comprises time delay and historical operating time. When performing of the smart link aggregation on the first communication link and the second communication link according to the operating parameter, the connecting unit 602 is configured to acquire the time delay of the at least one application. An application with the time delay longer than a preset time delay is selected. The historical operating time of each application of the application with the time delay longer than a preset time delay is acquired. A first target application is determined, wherein the historical operating time of the first target application is longer than a preset operating time; detect a touch operation on the first target application. The communication link corresponding to the first target application is closed in response to not detecting the touch operation, the communication link comprising at least one of the first communication link and the second communication link.

In an optional embodiment, the operating parameter comprises interactive state parameter and time delay, and the interactive state parameter comprises continuous touch duration. To perform the smart link aggregation on the first communication link and the second communication link according to the operating parameter, the connecting unit 602 is configured to acquire the continuous touch duration of each application of at least one application in a preset duration. At least one target application is selected, wherein the continuous duration of the at least one target application is longer than the preset duration. The time delay of at least one target application is acquired. A second target application is determined, wherein the time delay of the second target application is longer than a preset time delay. A link connection of the second target application is adjusted.

In an optional embodiment, when adjusting of the link connection of the second target application, the connecting unit 602 is configured to acquire a link quality parameter of each communication link in the communication link connection. A target communication link is determined, wherein the link quality parameter of the target communication link is greater than a preset link quality parameter. Data of the second target application is transmitted through the target communication link.

In an optional embodiment, after determining a target communication link, wherein the link quality parameter of the target communication link is greater than a preset link quality parameter, the connecting unit 602 is configured to perform a shunt transmission on the data of the second target application, wherein the shunt transmission is configured to transmit the data through the target communication link and the communication link other than the target communication link simultaneously.

In an optional embodiment, after transmitting data of the second target application through the target communication link, the connecting unit 602 is configured to acquire a third target application. The third target application is a multi-user application, and is other than the second target application among the plurality of applications. The link connection between the third target application and the target communication link is maintained.

In an optional embodiment, the operating parameter comprises interactive state parameter and time delay, and the interactive state parameter comprises single touch frequency. To perform the smart link aggregation on the first communication link and the second communication link according to the operating parameter, the connecting unit 602 is configured to acquire the single touch frequency of each application of the at least application. At least one target application is selected, wherein the single touch frequency of the at least one target application is greater than a preset touch frequency. The time delay of the at least one target application is acquired, and a second target application is determined, wherein the time delay of the second target application is longer than a preset time delay. A connection state of the communication link of the second target application is adjusted.

In an optional embodiment, the smart link aggregation comprises transmitting data through a cellular communication link, a Wi-Fi communication link, or a dual Wi-Fi communication link.

Embodiments further provide a computer-readable storage medium. The computer-readable storage medium is configured to store a computer program for electronic data interchange. The computer program causes a processor of a computer to execute all or part of operations of the method of the above. The computer includes an electronic device.

Embodiments further provide a computer program product. The computer program product includes a computer-readable storage medium storing a computer program. The computer program is operable to cause the computer execute all or part of operations of the method of the above. The computer program product may be a software installation package. The computer includes an electronic device.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual embodiments, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory includes various medium capable of storing program codes, such as a transitory computer-readable medium, a non-transitory computer-readable medium. The non-transitory computer-readable medium includes a USB (universal serial bus) flash disk, a read-only memory (ROM), a random-access memory (RAM), a removable hard disk, disk, compact disc (CD), or the like.

It will be understood by those of ordinary skill in the art that all or a part of the various methods of the embodiments described above may be accomplished by means of a program to instruct associated hardware, the program may be stored in a computer readable storage, which may include a flash memory, a ROM, a RAM, disk or CD, and so on.

The embodiments of this application are described in detail above. Some examples are used herein to illustrate the principle and embodiment manners of this application. The description of the above embodiments is only used to help understand the method and core idea of this application. Meanwhile, for those of ordinary skill in the art, according to the idea of this application, there will be changes in the embodiment manner and the application scope. In summary, contents of this specification should not be construed as a limitation on this application.

What is claimed:

1. A method for link connection, for an electronic device, comprising:
   acquiring an operating parameter of at least one application in response to detecting the at least one application is running in the foreground;
   detecting a connection state of a communication link of the at least one application, the communication link comprising at least a first communication link and a second communication link; and
   performing a smart link aggregation on the first communication link and the second communication link according to the operating parameter,
   wherein the at least one application comprises an application, and the operating parameter comprises time delay, the performing the smart link aggregation on the first communication link and the second communication link according to the operating parameter comprising:
   acquiring the time delay of the application;
   acquiring a link quality parameter of the first communication link and the second communication link in response to the time delay shorter than a preset time delay;
   determining a target communication link, wherein the link quality parameter of the target communication link is less than a preset link quality parameter; and
   performing the smart link aggregation on the communication link other than the target communication link.

2. A method for link connection, for an electronic device, comprising:
   acquiring an operating parameter of at least one application in response to detecting the at least one application is running in the foreground;
   detecting a connection state of a communication link of the at least one application, the communication link comprising at least a first communication link and a second communication link; and
performing a smart link aggregation on the first communication link and the second communication link according to the operating parameter,
wherein the operating parameter comprises time delay and historical operating time, the performing of the smart link aggregation on the first communication link and the second communication link according to the operating parameter comprising:
   acquiring the time delay of the at least one application;
   selecting an application with the time delay longer than a preset time delay;
   acquiring the historical operating time of each application of the application with the time delay longer than the preset time delay;
   determining a first target application, wherein the historical operating time of the first target application is longer than a preset operating time;
   detecting a touch operation on the first target application; and
   closing the communication link corresponding to the first target application in response to not detecting the touch operation, the communication link comprising at least one of the first communication link and the second communication link.

3. The method of claim 1, wherein the performing of the smart link aggregation comprises transmitting data through a cellular communication link, a Wi-Fi communication link, or a dual Wi-Fi communication link.

4. An electronic device comprising:
a communication interface;
one or more processors;
a memory; and
one or more programs, wherein the one or more programs including instructions are stored in the memory and configured to be executed by the one or more processors for:
acquiring an operating parameter of at least one application in response to detecting the at least one application running in the foreground;
detecting a connection state of a communication link of the at least one application, the communication link comprising at least a first communication link and a second communication link;
performing a smart link aggregation on the first communication link and the second communication link according to the operating parameter,
wherein the operating parameter comprises interactive state parameter and time delay, and the interactive state parameter comprises continuous touch duration, the performing of the smart link aggregation on the first communication link and the second communication link according to the operating parameter comprising:
acquiring the continuous touch duration of each application of the at least one application in a preset duration;
selecting at least one target application, wherein the continuous touch duration of the at least one target application is longer than the preset duration;
acquiring the time delay of at least one target application;
determining a second target application, wherein the time delay of the second target application is longer than a preset time delay; and
adjusting a link connection of the second target application.

5. The electronic device of claim 4, wherein the adjusting of the link connection of the second target application comprises:
acquiring a link quality parameter of each communication link in the communication link connection;
determining a target communication link, wherein the link quality parameter of the target communication link is greater than a preset link quality parameter; and
transmitting data of the second target application through the target communication link.

6. The electronic device of claim 5, the one or more programs further comprising instructions for:
after determining the target communication link, wherein the link quality parameter of the target communication link is greater than the preset link quality parameter,
performing a shunt transmission on the data of the second target application, wherein the shunt transmission is configured to transmit the data through the target communication link and the communication link other than the target communication link simultaneously.

7. The electronic device of claim 5, the one or more programs further comprising instructions for:
after transmitting the data of the second target application through the target communication link,
determining a third target application, wherein the third target application is a multi-user application and is other than the second target application among the at least one application; and
maintaining the link connection between the third target application and the target communication link.

8. The electronic device of claim 4, wherein the performing of the smart link aggregation comprises transmitting data through a cellular communication link, a Wi-Fi communication link, or a dual Wi-Fi communication link.

9. The method of claim 2, wherein the performing of the smart link aggregation comprises transmitting data through a cellular communication link, a Wi-Fi communication link, or a dual Wi-Fi communication link.

* * * * *